US008269615B2

(12) United States Patent
Ieda et al.

(10) Patent No.: US 8,269,615 B2
(45) Date of Patent: Sep. 18, 2012

(54) DOOR HANDLE AND LOCKING SYSTEM

(75) Inventors: Kiyokazu Ieda, Kariya (JP); Eiji Mushiake, Chita-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 760 days.

(21) Appl. No.: 12/410,915

(22) Filed: Mar. 25, 2009

(65) Prior Publication Data

US 2009/0284358 A1 Nov. 19, 2009

(30) Foreign Application Priority Data

May 16, 2008 (JP) ................................ 2008-129746

(51) Int. Cl.
*B60Q 1/00* (2006.01)

(52) U.S. Cl. ................. 340/425.5; 340/447; 340/426.23

(58) Field of Classification Search ............... 340/425.5, 340/5.72, 428, 426.16, 426.17, 426.2, 426.21, 340/426.23, 426.28, 438–439, 447
See application file for complete search history.

(56) References Cited

U.S. PATENT DOCUMENTS

| | | | | |
|---|---|---|---|---|
| 7,065,439 | B2 | 6/2006 | Sakakura | |
| 2004/0223336 | A1 * | 11/2004 | Murakami et al. | 362/501 |
| 2007/0126246 | A1 * | 6/2007 | Suzuki et al. | 292/336.3 |
| 2007/0230201 | A1 * | 10/2007 | Oba et al. | 362/501 |
| 2008/0079537 | A1 * | 4/2008 | Touge | 340/5.72 |

FOREIGN PATENT DOCUMENTS

| | | |
|---|---|---|
| JP | 2004-108059 A | 4/2004 |
| JP | 2007-254993 A | 10/2007 |

* cited by examiner

*Primary Examiner* — Daniel Previl

(74) *Attorney, Agent, or Firm* — Buchanan Ingersoll & Rooney PC

(57) ABSTRACT

A door handle, for opening and closing a door such as a vehicular door, includes: a transmitting antenna, transmitting a communication signal to a portable device carried by a user; an indicating portion, optically indicating a state of the door, including locked and unlocked states of the door, to the user with a visible light; and a first power supply portion, electromagnetically coupled to the transmitting antenna and supplying electric power to the indicating portion in response to a transmission of the communication signal.

11 Claims, 7 Drawing Sheets

DOOR HANDLE AND LOCKING SYSTEM

CROSS REFERENCE TO RELATED APPLICATIONS

This application is based on and claims priority under 35 U.S.C. §119 to Japanese Patent Application 2008-129746, filed on May 16, 2008, the entire contents of which is incorporated herein by reference.

FIELD OF THE INVENTION

The present invention relates to a door handle provided at a door for opening and closing the door. Further, the present invention relates to a locking system having the door handle.

BACKGROUND

A known locking system (a smart entry system) executes a communication between a portable device carried by an occupant and a main device provided at a vehicle, identifies the portable device and automatically locks and unlocks a door for the vehicle (which will be referred to as a vehicle door hereinafter). In the locking system, the vehicle door may be unlocked when an operation of the occupant relative to a door handle, such that the occupant contacts the door handle provided at the vehicle door, is detected because of a security concern about unlocking of the vehicle door right after an identification of the portable device. In such case, the occupant may be informed of a result of the identification of the portable device (i.e., whether or not the vehicle door is in a state of waiting for an operational input of the occupant (waiting for a command to unlock the vehicle door) after the portable device is identified). For example, when the portable device is not identified and the occupant contacts the door handle, the vehicle door is not unlocked. Therefore, the occupant needs to unlock the vehicle door by a remote control or a mechanical key and the locking system may become inconvenient. Further, when the vehicle door is locked, the occupant needs to check whether or not the vehicle door is locked at each locking operation. Therefore, the locking system may become inconvenient. Thus, the locking system may become inconvenient when the occupant is not informed of locked or unlocked states of the vehicle door and a state of the identification of the portable device.

A door handle for a vehicle is disclosed in JP2004-108059A (which will be referred to as reference 1 hereinafter). The door handle according to reference 1 includes an indicator and the door handle indicates a locking confirmation term. The indicator is provided at a door handle or in the vicinity of the door handle and is configured by a light emitting diode (LED). Further, according to JP2007-254993A (which will be referred to as reference 2 hereinafter), a LED, which is embedded in a door handle, is cordlessly supplied with electric power.

A door handle for a vehicle disclosed in reference 2 omits a wiring for supplying an electric source to the LED. Therefore, the LED, serving as an indicating portion, is added without modifying a wiring of a known door handle. However, a power transmitting portion and a power receiving portion are provided at a door panel and the door handle, respectively for cordless power supply. Therefore a size of an entire system is increased.

A need thus exits for a door handle and a locking system, which are not susceptible to the drawback mentioned above.

SUMMARY OF THE INVENTION

According to an aspect of the present invention, a door handle for opening and closing a door such as a vehicular door, includes: a transmitting antenna, transmitting a communication signal to a portable device carried by a user; an indicating portion, optically indicating a state of the door, including locked and unlocked states of the door, to the user with a visible light; and a first power supply portion, electromagnetically coupled to the transmitting antenna and supplying electric power to the indicating portion in response to a transmission of the communication signal According to a further aspect of the present invention, a door handle for opening and closing a door such as a vehicular door, includes: an operation detecting portion, detecting an operation of a user relative to the door handle; an indicating portion, optically indicating a state of the door, including locked and unlocked states of the door, to the user with a visible light; and a power supply portion, electromagnetically coupled to the operation detecting portion, which is driven by alternating current, and supplying electric power to the indicating portion according to a driving of the operation detecting portion.

According to a further aspect of the present invention, a locking system transmitting a communication signal to a portable device carried by a user, receiving a receiving signal from the portable device, identifying the portable device on the basis of an identification data included in the receiving signal, unlocking a door such as a vehicular on the basis of an operation of the user relative to the door after an identification of the portable device and locking the door on the basis of a predetermined condition when the user having the portable device is outside of the door, the locking system includes: a transmitting antenna, transmitting the communication signal to the portable device; an indicating portion, optically indicating a state of the door, including locked and unlocked states of the door, to the user with a visible light; and a power supply portion, electromagnetically coupled to the transmitting antenna and supplying electric power to the indicating portion according to an operation of the communication signal; and a system control portion, transmitting the communication signal via the transmitting antenna and indicating the state of the door via the indicating portion by changing a time duration of a carrier wave of the communication signal according to the state of the door.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

A detailed description of a door handle 1 for a vehicle 4 (a door handle), which is applied to a locking system (a smart entry system), will be provided hereinafter with reference to the attached drawings. The door handle 1 for the vehicle 4 will be referred to as a door handle 1 hereinafter.

[First Embodiment]

Figure 1:
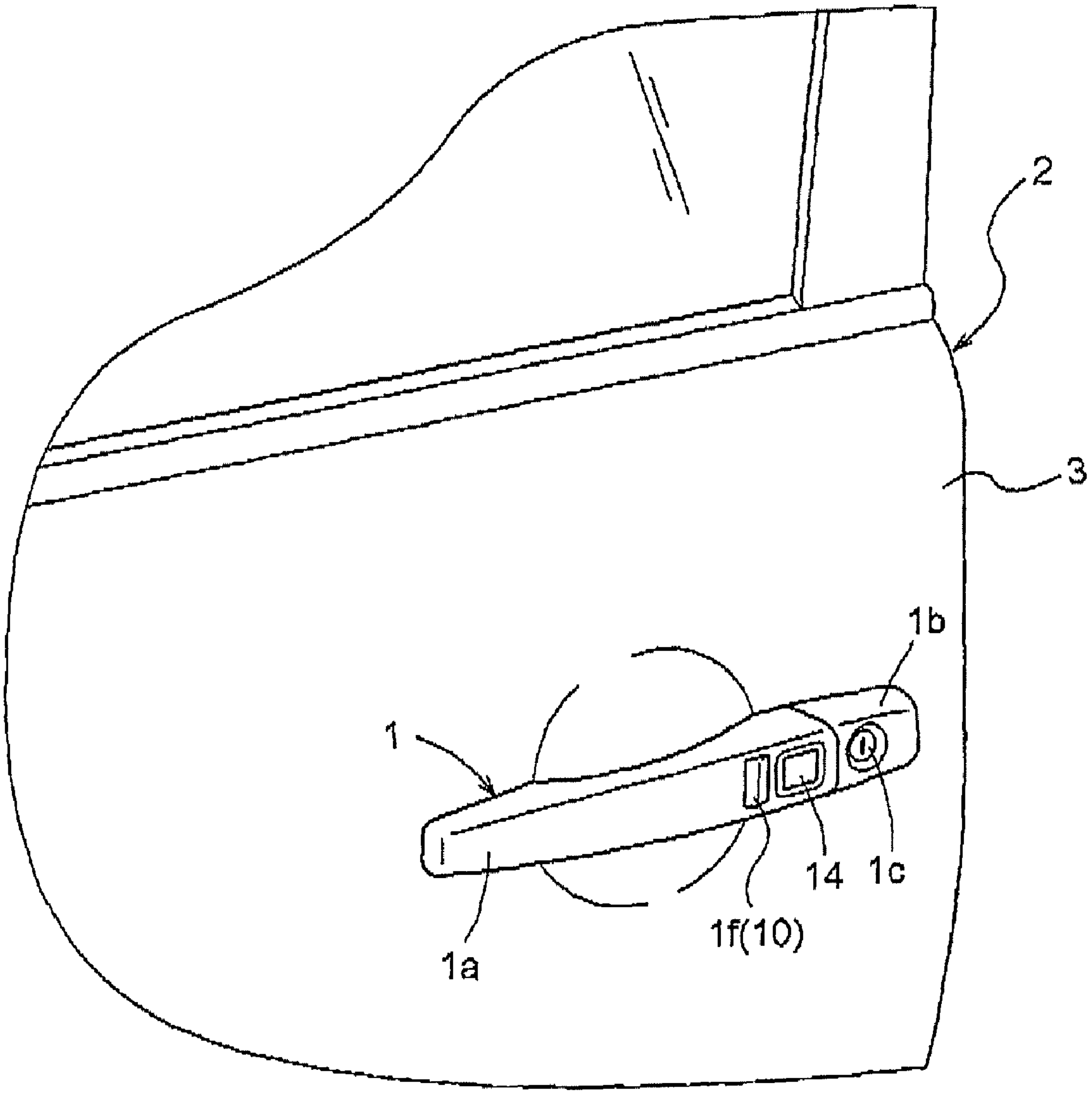
FIG. 1 is a perspective view illustrating an example of a door for a vehicle, at which a door handle according to an embodiment is provided.
Figure 2:
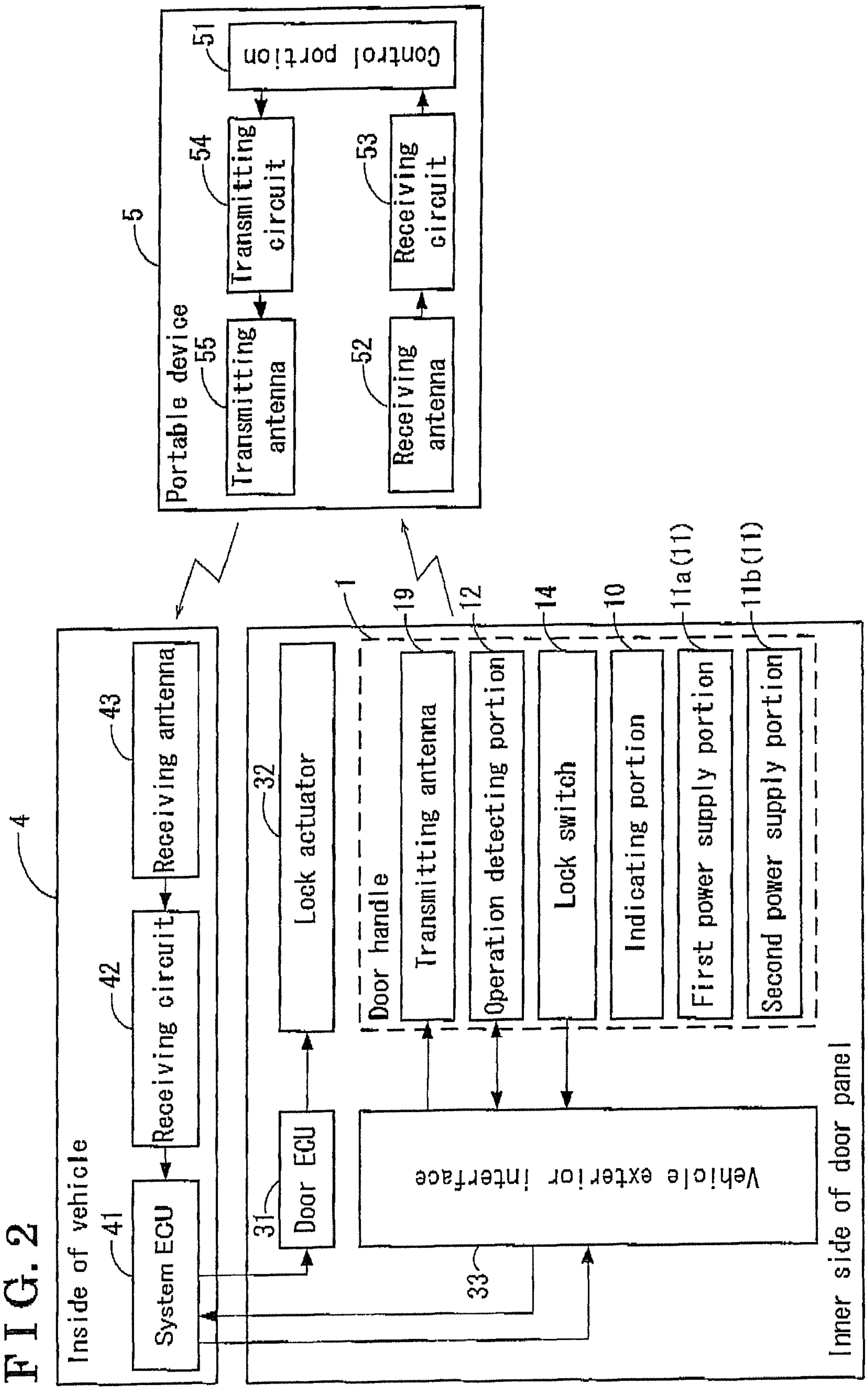
FIG. 2 is a block diagram schematically illustrating an example of a configuration of a locking system.
Figure 3:
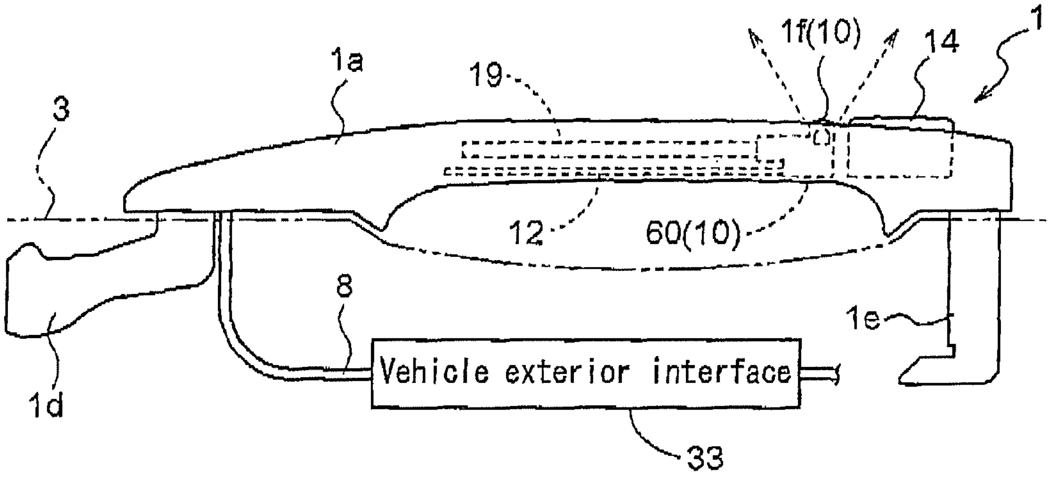
FIG. 3 is a side view illustrating the door handle.

A description of the looking system will be provided hereinafter. FIG. 1 is a perspective view illustrating an example of a door 2 for the vehicle 4 (a door) (which will be referred to as a vehicle door 2 hereinafter), at which the door handle 1 according to a first embodiment is provided. FIG. 2 is a block diagram schematically illustrating an example of a configuration of the locking system. FIG. 3 is a side view illustrating a handle body 1*a* of the door handle 1. An opening and closing of a door for a vehicle may be controlled by a locking system. However, a system, which does not control the opening and closing of the vehicle door 2 and which controls locking and unlocking of the vehicle door 2, will be described hereinafter as an example for explanatory purpose.

As illustrated in FIGS. 1 and 3, the door handle 1 is supported by a handle frame, which is provided at an inside of a door panel 3 of the vehicle door 2. As illustrated in FIG. 3, the door handle 1 includes a hinge portion 1*d* and an arm portion 1*e*, The hinge portion 1*d* functions as a fulcrum when the door handle 1 is pulled. The door handle 1 further includes the handle body 1*a* and a handle cap 1*b*. The handle cap 1*b* includes a key cylinder 1*c* for mechanically locking and unlocking the vehicle door 2 by a manual operation of an occupant (a user). A surface of the handle body 1*a* of the door handle 1 facing the vehicle door 2 (a door panel 3) is formed into a recessed surface. Therefore, a clearance, into which a hand of the occupant is inserted, is generated between the handle body 1*a* of the door handle 1 and the door panel 3. As illustrated in FIG. 1, a recessed portion may be provided at the door panel 3 facing the handle body 1*a*, so that the handle body 1*a* is downsized and the clearance, into which the hand of the occupant is inserted, is sufficiently generated between the door handle 1 and the door panel 3.

As illustrated in FIG. 2, the locking system according to the first embodiment is configured by forming a system electronic control unit (ECU) 41 (a system control portion) as a core thereof. The system ECU 41 is applied to the vehicle 4. The system ECU 41 is configured by a microcomputer or an electronic circuit. The system ECU 41 identifies a portable device 5 as the portable device 5 corresponding to the vehicle 4 or as the portable device 5 not corresponding to the vehicle 4 when the occupant (a driver) having the portable device 5 approaches the vehicle 4. After the system ECU 41 identifies the portable device 5 as the portable device 5 corresponding to the vehicle 4, the system ECU 41 drives a lock actuator 32 via a door electronic control unit (ECU) 31 under a predetermined condition and thereby unlocking the vehicle door 2. The lock actuator 32 is a motor or a solenoid, which actuates a lock mechanism of the vehicle door 2 on the basis of an electric signal. According to the first embodiment, the predetermined condition is that a predetermined active operation is applied to the door handle 1. For example, the predetermined active operation includes that the occupant touches the door handle 1 and that the occupant pulls the door handle 1. The predetermined active operation is detected by an operation detecting portion 12 and transmitted to the system ECU 41 via a vehicle exterior interface 33, which is provided at the inside of the door panel 3, by means of an electric wiring 8. According to the first embodiment, the operation detecting portion 12 is an electrostatic capacitance sensor (described later). An example of an unlocking control of the locking system according to the first embodiment will be described sequentially hereinafter.

When the vehicle 4 is locked and parked, the system ECU 41 transmits a request signal (a communication signal) to the portable device 5 toward an outside of the vehicle 4 via the vehicle exterior interface 33, provided at the inside of the door panel 3, the electric wiring 8 and a first transmitting antenna 19 (a transmitting antenna), provided at an inside of the door handle 1. The first transmitting antenna 19 is, for example, a soft ferrite bar antenna configured by winding a resonant coil 19*a* (a conductor) around a core 19*a* (see FIG. 4). The vehicle exterior interface 33 includes a first transmitting circuit 34, such as an oscillator circuit and a modulation circuit, to transmit the request signal therethrough. The request signal is transmitted intermittently at predetermined intervals by a carrier wave of low frequency (LF) band of approximately 130 kHz. The carrier wave is transmitted for a predetermined time duration at each transmission of the request signal, which is transmitted intermittently.

When the portable device 5 approaches within a range where the request signal reaches (i.e., a predetermined range in the vicinity of the vehicle 4), a control portion 51 of the portable device 5 receives the request signal via a first receiving antenna 52 and a first receiving circuit 53. The portable device 5 then transmits a response signal to the request signal via a second transmitting circuit 54 and a second transmitting antenna 55. When the portable device 5 transmits the response signal, the portable device 5 includes an ID code (an identification data) in the response signal. The response signal is transmitted by a carrier wave of ultra high frequency (UHF) band of approximately 300 MHz.

The portable device 5 also functions as a remote control by which locking and unlocking of the vehicle door 2 is controlled remotely according to a button operation by the occupant. When the portable device 5 functions as the remote control, locking and unlocking request signals are transmitted by the carrier wave of the UHF band. The response signal and the locking and unlocking request signals, which are transmitted from the portable device 5, are received by a second receiving antenna 43, which is provided at a door mirror at an inside of the vehicle 4, for example, and then transmitted to the system ECU 41 via a second receiving circuit 42 at the inside of the vehicle 4. The system ECU 41 executes an identification of the portable device 5 on the basis of the ID code, included in the response signal and the locking and unlocking request signals from the portable device 5.

When the received ID code and a predetermined ID code are matched, the system ECU 41 identifies the portable device 5, which transmits the response signal or the locking and unlocking request signals, as the portable device 5 corresponding to the vehicle 4. When the system ECU 41 identifies the portable device 5 on the basis of the locking and unlocking request signals, the system ECU 41 drives the lock actuator 32 to lock and unlock the vehicle door 2. When the system ECU 41 identifies the portable device 5 on the basis of the response signal to the request signal, the system ECU 41 is in a state of waiting for a command to unlock the vehicle door 2 (i.e., the system ECU 41 waits for an operational input by the occupant).

An example of the command to unlock the vehicle door 2 (i.e., the operational input by the occupant) is that the occupant operates an active operation relative to the door handle 1, such that the occupant grabs the door handle 1. When the occupant having the portable device 5 approaches the vehicle 4 and contacts the door handle 1, the active operation of the occupant is detected by the operation detecting portion 12, which is provided at the door handle 1. A detected result of the operation detecting portion 12 is transmitted to the system ECU 41 via the vehicle exterior interface 33. The system ECU 41 drives the lock actuator 32 via the door ECU 31 to unlock the vehicle door 2. Alternatively, the detected result of the operation detecting portion 12 may be directly transmitted to the door ECU 31. More specifically, the system ECU 41 may send a command to wait for unlocking of the vehicle door 2 to the door ECU 31 and the door ECU 31 is in a state of waiting for the command to unlock the vehicle door 2 (i.e., the door ECU 31 waits for the operational input by the occupant). When the detected result of the operation detecting portion 12 is transmitted to the door ECU 31, which is in the waiting state, the door ECU 31 drives the lock actuator 32 to unlock the vehicle door 2.

A control at the time of unlocking is described above. A similar control is executed at the time of locking. A system is configured to lock the vehicle door 2 when the occupant having the portable device 5 gets out of the vehicle 4 and operates a predetermined active operation, such as contacting the door handle 1 and the like. According to the embodiment, the vehicle door 2 is locked when the occupant gets out of the vehicle 4 and then pushes a lock switch 14. The operational signal relative to the lock switch 14 is transmitted to the system ECU 41 via the electric wiring 8 and the vehicle exterior interface 33. The system ECU 41 controls the lock actuator 32 via the door ECU 31 to lock the vehicle door 2.

A known locking system controls locking and unlocking of a vehicle door not on the basis of the active operation of the occupant but on the basis of determination of a distance between the portable device 5 and the vehicle 4 according to a strength of the response signal of the portable device 5 and a strength of the request signal received by the portable device 5. Although such locking system may be applied, in the first embodiment, the locking system on the basis of the active operation of the occupant is described hereinafter as an example.

Figure 4:
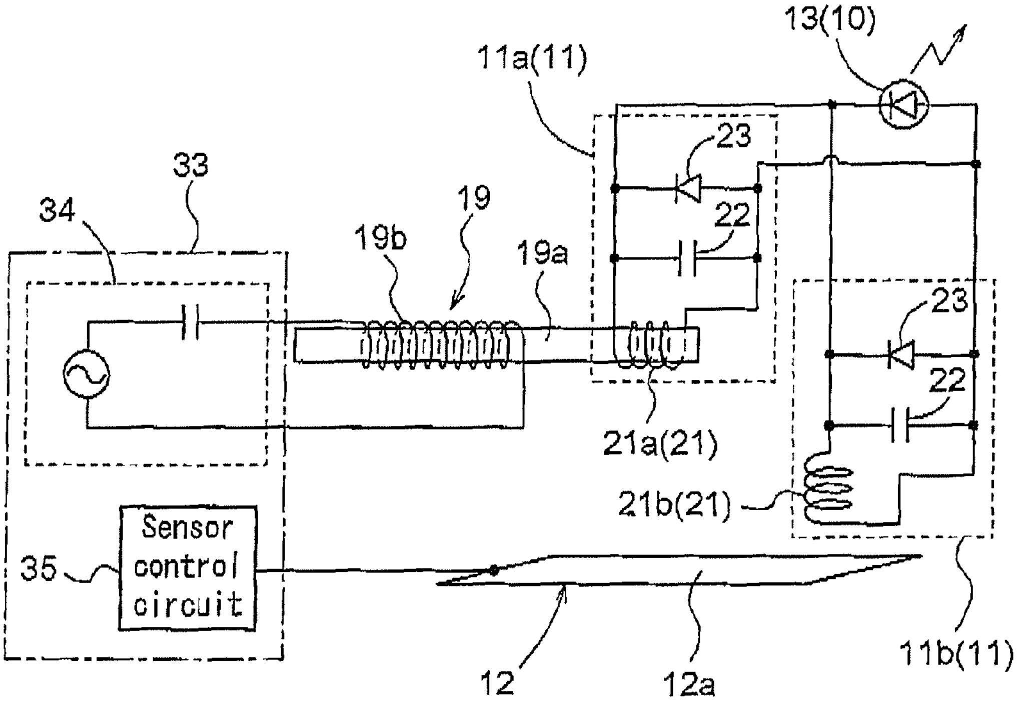
FIG. 4 is a block diagram schematically illustrating configurations of an indicating portion and a power supply portion.

The occupant is informed of a state of the vehicle door 2 when the system ECU 41 is in the state of waiting for the operational input of the occupant at the time of unlocking and when the vehicle door 2 is in a locked state. According to the first embodiment, an indicating portion 10 is provided at the door handle 1. The indicating portion 10 optically indicates the state of the vehicle door 2 to the occupant by a visible light. FIG. 4 is a block diagram schematically illustrating a configuration of the door handle 1 having the indicating portion 10 (i.e., configurations of the indicating portion 10 and a power supply portion 11 (described later)). The indicating portion 10 includes a light emitting portion 13. The light emitting portion 13 is configured by a red, blue or yellow light emitting diode (LED) and the like, which serves as a light emitting element outputting a light in a wavelength of a visible range. The light emitting portion 13 (the indicating portion 10) emits the light when the light emitting portion 13 (the indicating portion 10) is supplied with electric power by the power supply portion 11.

As described above, the first transmitting antenna 19 is the bar antenna configured by winding the resonant coil 19*b* around the core 19*a*. The resonant coil 19*b* is a linear-shaped conductor. The core 19*a* is formed into a bar shape and is a soft ferrite. The operation detecting portion 12 is a capacitance sensor having a sensor electrode 12*a*. The sensor electrode 12*a* is driven by alternating current (AC) by a sensor control circuit 35, which is provided at the vehicle exterior interface 33. For example, the sensor control circuit 35 applies the alternating current to the sensor electrode 12*a* and detects an electrostatic capacitance of the sensor electrode 12*a* by a known switched capacitor control or the like. When the occupant operates the door handle 1, the electrostatic capacitance of the sensor electrode 12*a* is changed. The sensor control circuit 35 outputs the detected electrostatic capacitance, a difference in the electrostatic capacitance between an operation time and a non-operation time, a detected result of an operation on the basis of a change in the electrostatic capacitance and the like to the system ECU 41 and the door ECU 31.

According to the first embodiment, the power supply portion 11 includes first and second power supply portions 11*a* and 11*b*, each of which supplies the electric power to the indicating portion 13. The first power supply portion 11*a* is electromagnetically coupled to the first transmitting antenna 19 and supplies the electric power to the indicating portion 10 in accordance with transmission of the request signal (the communication signal). The second power supply portion 11*b* is electromagnetically coupled to the sensor electrode 12*a* (the operation detecting portion 12) and supplies the electric power to the indicating portion 10 according to driving of the operation detecting portion 12.

The power supply portion 11 includes connecting coils 21, tuning capacitors 22 and rectifier diodes 23. A tuning circuit (a first power supply circuit, a second power supply circuit) is configured by each of the connecting coils 21 and the tuning capacitors 22. As illustrated in FIG. 4, configurations of the first power supply portion 11*a* and the second power supply portion 11*b* are similar. Therefore, similar components are shown by the same reference numerals between the first power supply portion 11*a* and the second power supply portion 11*b*. However, a variable of each of the connecting coils 21, the tuning capacitors 22 and the rectifier diodes 23 is selectively determined according to an electromagnetic coupling partner and is not always the same value. A principle that a direct current power source is generated by the power supply portion 11 is known. Therefore, a detailed description of the principle is not provided.

Figure 5:
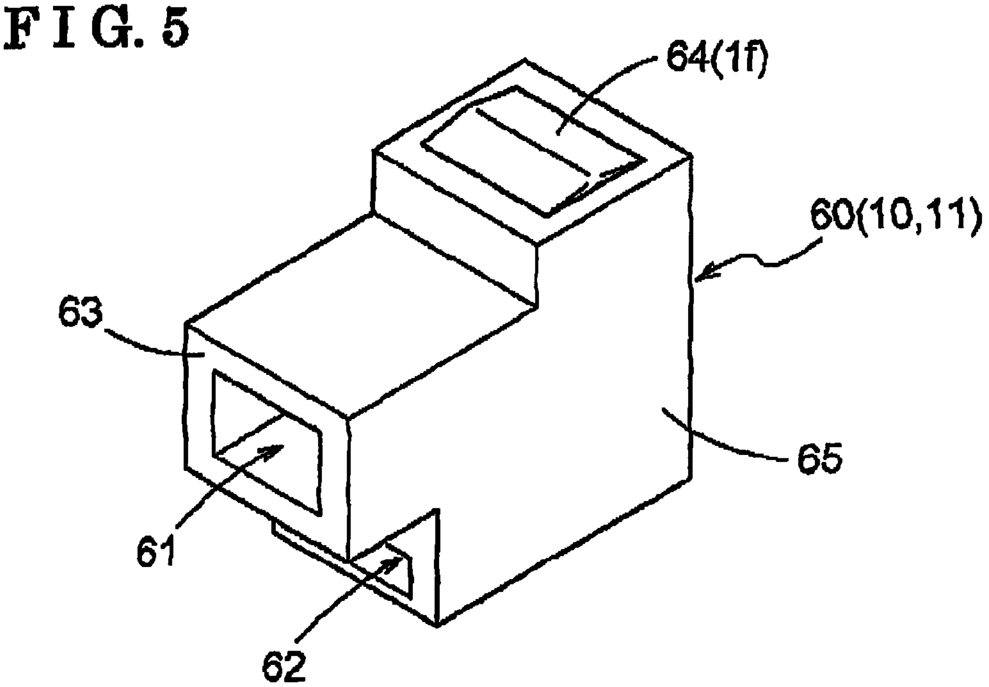
FIG. 5 is a perspective view illustrating a light emitting module.
Figure 6:
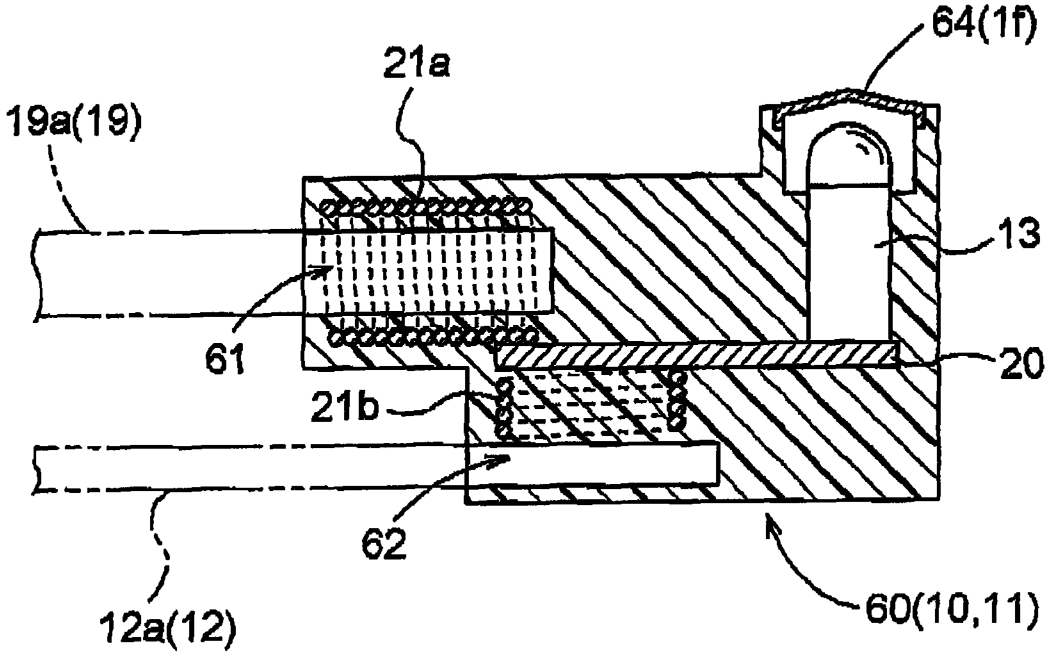
FIG. 6 is a cross-sectional view illustrating the light emitting module.

A manner of assembling the power supply portion 11 and the indicating portion 10 to the door handle 1 will be described hereinafter. The power supply portion 11 and the indicating portion 10 are integrally provided at a light emitting module 60 and assembled at the inside of the door handle 1. FIG. 5 is a perspective view illustrating the light emitting module 60. FIG. 6 is a cross-sectional view illustrating the light emitting module 60.

The light emitting module 60 is configured by the power supply portion 11 and the LED (the light emitting element), serving as the light emitting portion 13, each of which is sealed and held at an inside of the light emitting module 60 by a resin mold 65. As illustrated in FIG. 5, the light emitting module 60 includes an antenna insertion portion 61. The antenna insertion portion 61 is formed into a recessed-shape to receive and hold the core 19*a* at an end portion of the first transmitting antenna 19. A first connecting coil 21*a* of the first power supply portion 11*a* is sealed and held at an inside of side walls 63 of the antenna insertion portion 61. The first connecting coil 21*a* is wound around the core 19*a* and the first transmitting antenna 19 is held at the antenna insertion portion 61.

The light emitting module 60 further includes an electrode insertion portion 62. The electrode insertion portion 62 receives and holds the sensor electrode 12*a* at an end portion of the sensor electrode 12*a* of the operation detecting portion 12. One end portion of the second connecting coil 21*b* of the second power supply portion 11*b* faces the sensor electrode 12*b*. The second connecting coil 21 is sealed and held at an inside of a side wall of the electrode insertion portion 62. As illustrated in FIG. 3, the sensor electrode 12*a* is provided at the inside of the door handle 1 as close as possible to a side of the door handle 1 facing the door panel 3 so that the electrostatic capacitance between the hand of the occupant and the door handle 1 is accurately detected. Therefore, a thickness of a side wall of the electrode insertion portion 62, which receives the sensor electrode 12*a*, facing the door panel 3 (i.e., a lower portion of the light emitting module 60 in FIG. 5) is provided to be thin. The electrode insertion portion 62 includes the side wall facing the door panel 3 in the example shown in FIGS. 5 and 6. However, the side wall of the electrode insertion portion 62 facing the door panel 3 may not be provided and the electrode insertion portion 62 may include only three side walls. In such case, the sensor electrode 12*a* may be fixed by the light emitting module 60 together with the handle body 1*a*.

The substrate 20 is sealed and held at the intermediate portion of the light emitting module 60. The tuning capacitors 22 and the rectifier diodes 23 of the first and second power supply portions 11*a* and 11*b* are mounted on the substrate 20. Further, terminals of the first and second connecting coils 21*a* and 21*b* are mounted on the substrate 20. Thus, the power supply portion 11 is configured on the substrate 20. Furthermore, the LED, serving as the light emitting portion 13, is mounted on the substrate 20. The light emitting portion 13 emits the light by being supplied with the electrical power by the first and second power supply portions 11*a* and 11*b* through a wiring mounted on the substrate 20. A light diffusing portion 64 is integrally provided at the light emitting module 60. The light diffusing portion 64 diffuses the light emitted by the LED, serving as the light emitting portion 13. The light emitting module 60 is provided at the door handle 1 so that the light diffusing portion 64 is exposed to an outside of the door handle 1. The light diffusing portion 64 functions as a light decorative portion 1*f* (the indicating portion 10) at the door handle 1.

As described above, the light emitting module 60 is formed by the first and second connecting coils 21*a* and 21*b*, the substrate 20, on which circuits of the first and second power supply portions 11*a* and 11*b* are mounted, and the light emitting portion 13, each of which is integrally provided at the light emitting module 60 by the resin mold 65.

A sequence of indicating the state of the vehicle door 2 by using the door handle 1, whose configuration is described above, will be described hereinafter with reference to FIG. 7. As described above, when the vehicle 4 is parked (i.e., after the occupant gets out of the vehicle 4 and the vehicle door 2 is in the locked state), the request signal is intermittently transmitted from the first transmitting antenna 19 at the predetermined intervals. The carrier wave is transmitted for the predetermined time duration at each transmission of the request signal, which is transmitted intermittently. The request signal is transmitted by the carrier wave of the LF band of approximately 130 kHz. The time duration of each transmission of the request signal is a time frame T1 in the first embodiment.

The first connecting coil 21*a* of the first power supply portion 11*a* is magnetically coupled to the first transmitting antenna 19 to generate the electric power during the time frame T1 in which a radio wave (the carrier wave) is transmitted from the first transmitting antenna 19. Consequently, the light emitting portion 13 is supplied with the electric power by the first power supply portion 11*a*. The light emitting portion 13 intermittently emits the light because the request signal is transmitted intermittently. Accordingly, the occupant is informed that the locking system is operated normally.

The portable device 5, which receives the request signal, transmits the response signal. The system ECU 41 executes the identification of the portable device 5 on the basis of the response signal. When the identification of the portable device 5 is completed at a time t1 shown in FIG. 7, the operation detecting portion 12 is in the state of waiting for the operational input and the sensor electrode 12*a* is driven by the alternating current. The second connecting coil 21*b* of the second power supply portion 11*b* is electromagnetically coupled to the sensor electrode 12*a* to generate the electric power. Consequently, the light emitting portion 13 is supplied with the electric power from the second power supply portion 11*b*. Because the sensor electrode 12*b* is driven by the alternating current until the operational input, the light emitting portion 13 emits the light continuously. Accordingly, the occupant is informed that the portable device 5 is identified as the portable device 5 corresponding to the vehicle 4 and that the door handle 1 is unlocked when the hand of the occupant approaches the door handle 1.

According to the first embodiment, the first transmitting antenna 19 continues to transmit the request signal after the time t1. Further, the portable device 5 continues to transmit the response signal to the request signal after the time t1. In other words, the system ECU 41 continues to determine that the portable device 5 continues to exist in the predetermined range. Unlocking by a third person would be allowed if the occupant having the portable device 5 approaches the vehicle 4 without an intention of getting into the vehicle 4 and moves away from the vehicle 4 and if the system ECU 41 continues to be in the state of waiting for the operational input. According to the first embodiment, the system ECU 41 continues the identification of the portable device 5 in order to prevent unlocking by the third person and to ensure security. However, the transmission of the request signal may stop after the time t1. In such case, the identification of the portable device 5 may be canceled and the sensor electrode 12*a* may stop to be driven when the operational input is not inputted for a predetermined time in order to ensure the security.

Figure 7:
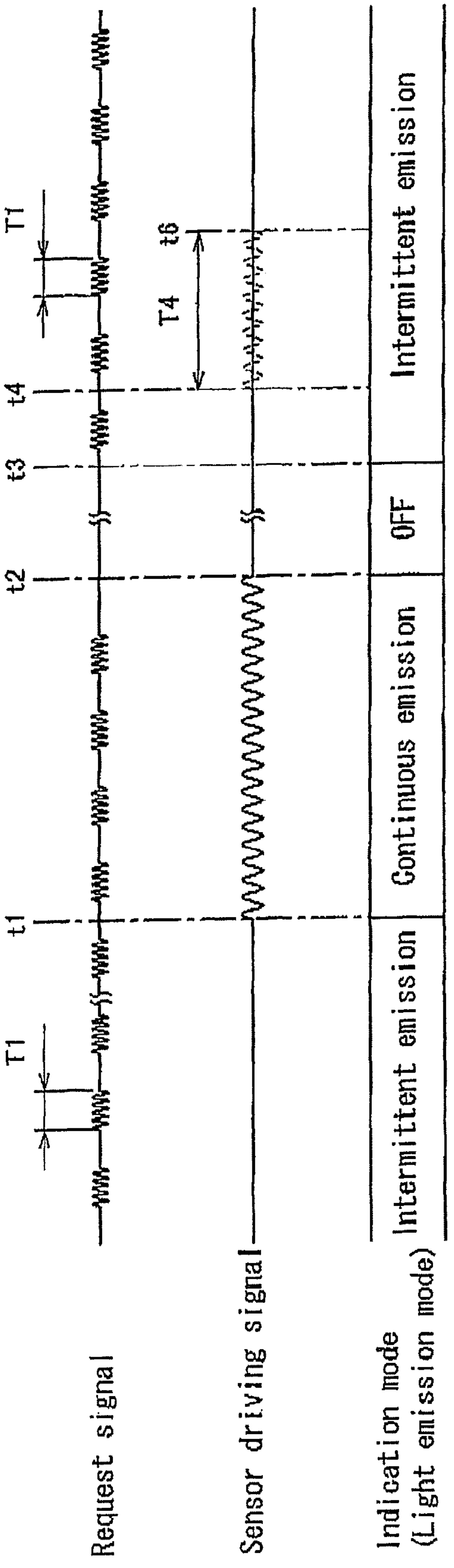
FIG. 7 is a timing chart schematically illustrating an example of an indication sequence.

When the operational input of the occupant is detected at a time t2 shown in FIG. 7, the vehicle door 2 is unlocked and the sensor electrode 12*a* stops to be driven. Consequently, the second power supply portion 11*b* stops to generate the electric power and the light emitting portion 13 is in a turned off state. Further, the vehicle door 2 is unlocked by the operational input of the occupant. Therefore, the first transmitting antenna 19 does not transmit the request signal and the first power supply portion 11*b* stops to generate the electric power. Consequently, the light emitting portion 13 does not emit the light continuously and is in the turned off state.

When the occupant gets out of the vehicle 4 and the vehicle door 2 is locked, the first transmitting antenna 19 starts to transmit the request signal. The first connecting coil 21*a* of the first power supply portion 11*a* is electromagnetically coupled to the first transmitting antenna 19 to supply the light emitting portion 13 with the electric power. The request signal is transmitted intermittently and the light emitting portion 13 emits the light intermittently. Accordingly, the occupant is informed that the locking system is operated normally and that the vehicle door 2 is locked.

When the portable device 5 responds to the request signal from the first transmitting antenna 19 after the time t3, a condition for the identification of the portable device 5 may be immediately met at, for example, a time t4 shown in FIG. 7. In such case, as illustrated by a dashed-line in FIG. 7, the sensor electrode 12*a* may be driven from the time t4 to a time t6. When the sensor electrode 12*a* is driven, the second power supply portion 11*b* supplies the electric power to the light emitting portion 13 and the light emitting portion 13 emits the light continuously. The occupant is informed again that the locking system is operated normally and the vehicle door 2 is locked by a continuous emission of the light emitting portion 13. When the occupant having the portable device 5 moves out of the range where the request signal reaches or when a predetermined time frame T4 elapses at the time t6, the sensor electrode 12*a* stops to be driven.

According to the first embodiment, an example is described in which the light emitting portion 13 emits the light intermittently when the light emitting portion 13 is supplied with the electric power by the electromagnetic coupling to the first transmitting antenna 19 and in which the light emitting portion 13 emits the light continuously when the light emitting portion 13 is supplied with the electric power by the electromagnetic coupling to the sensor electrode 12*a*. However, a manner of a light emission is not limited to the above-described example. The example described above is provided to simplify the description and understanding and is not provided to limit the present invention and embodiments of the present invention. Even when the electric power is intermittently generated by the electromagnetic coupling to the first transmitting antenna 19 and the light emitting portion 13 emits the light intermittently, the light may be regarded as the continuous emission by a human eye. Further, even when the request signal is transmitted intermittently, the interval may be short and the electric power may not be generated intermittently. Furthermore, the sensor electrode 12*a* may be intermittently driven by the alternating current and the light emitting portion 13 may emit the light intermittently by the electromagnetic coupling to the sensor electrode 12*a*.

As described above, the door handle 1 includes: the first transmitting antenna 19, which transmits the request signal (the communication signal) to the portable device 5 carried by the occupant; the operation detecting portion 12, which detects the operation of the occupant relative to the door handle 1; the indicating portion 10, which optically indicates the state of the vehicle door 2 including the locked and unlocked states thereof to the occupant by the visible light; the first power supply portion 11*a* (11), which is electromagnetically coupled to the first transmitting antenna 19 to supply the electric power to the indicating portion 10 according to the transmission of the communication signal; and the second power supply portion 11*b* (11), which is electromagnetically coupled to the operation detecting portion 12, being driven by the alternating current, to supply the electric power to the indicating portion 10 according to the driving of the operation detecting portion 12. Thus, the door handle 1 according to the first embodiment indicates the state of the vehicle door 2 via the indicating portion 10 according to the transmission of the request signal and the driving of the operation detecting portion 12 without additionally including a control portion for controlling the indicating portion 10.

[Second Embodiment]

Figure 8:
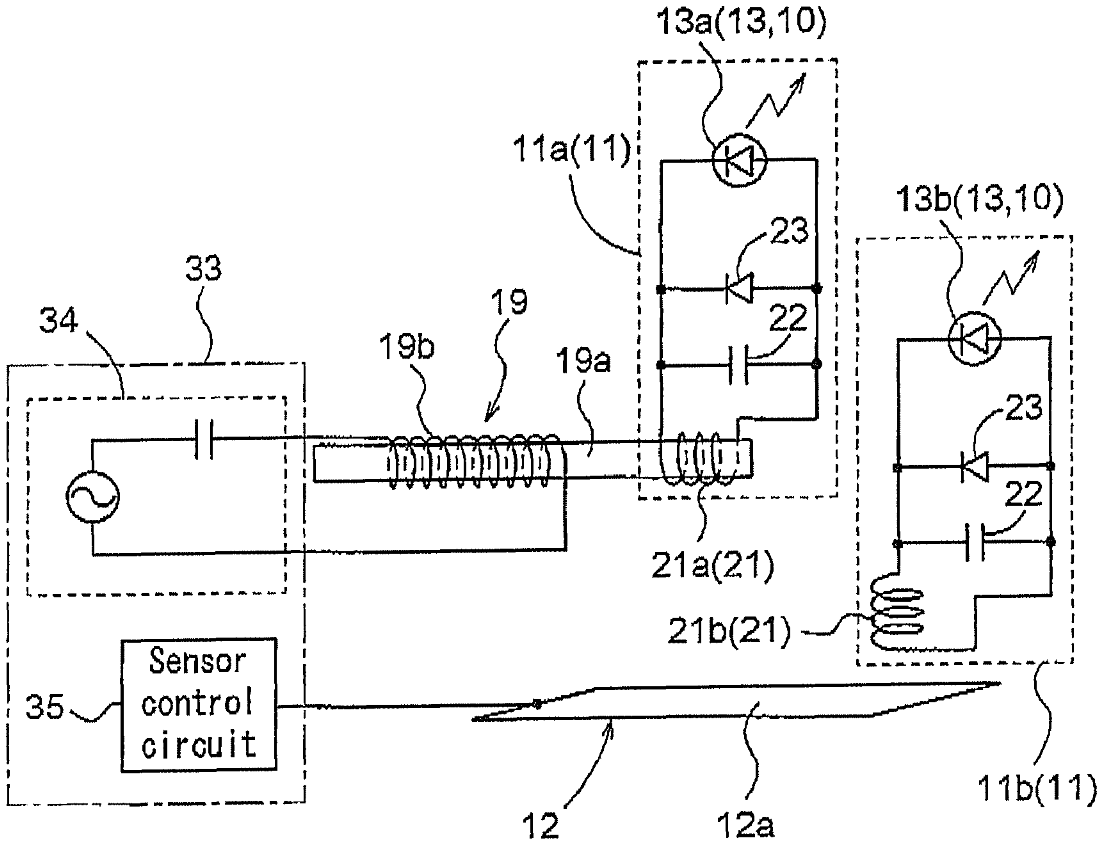
FIG. 8 is a block diagram illustrating another configuration of the indicating portion.

FIG. 8 is a block diagram schematically illustrating another configuration of the indicating portion 10. According to the first embodiment, the indicating portion 10 includes one light emitting portion 13, which emits the light by being supplied with the electric power from the first and second power supply portions 11*a* and 11*b*. However, as illustrated in FIG. 8, the indicating portion 10 may include the light emitting portion 13 having a first light emitting portion 13*a* (a first indicating portion), which is supplied with the electric power from the first power supply portion 11*a*, and a second light emitting portion 13*b* (a second indicating portion), which is supplied with the electric power from the second power supply portion 11*b*. The first and second light emitting portions 13*a* and 13*b* may be configured by the LEDs of different colors to improve visibility. Further, when a plurality of the light emitting portions 13 is provided (for example, two of the light emitting portions 13 are provided), a plurality of LEDs (the light emitting elements) may be integrally provided at the light emitting module 60.

[Third Embodiment]

According to the first and second embodiments, the power supply portion 11 includes the first power supply portion 11*a*, electromagnetically coupled to the first transmitting antenna 19 and the second power supply portion 11*b*, electromagnetically coupled to the sensor electrode 12*a*. However, the power supply portion 11 may only include either the first power supply portion 11*a* or the second power supply portion 11*b*. An example, in which the power supply portion 11 includes only the first power supply portion 11*a*, will be described hereinafter with reference to FIG. 9. Description similar to the first embodiment will be omitted.

As well as the first and second embodiments, the request signal is transmitted via the first transmitting antenna 19 before the time t1 (i.e., before the identification of the portable device 5 is completed). As well as the first and second embodiments, the time duration of the carrier wave for each transmission of the request signal is the time frame T1. According to the third embodiment, the light emitting portion 13 is configured not to emit the light by adjusting a circuit constant of the first power supply portion 11*a* (the power supply portion 11) and a circuit constant of the light emitting portion 13. In other words, the electric power for emitting the light from the light emitting portion 13 to be visible to the occupant, is not generated by the request signal transmitted during the time frame T1. Alternatively, the circuit constant of the light emitting portion 13 (for example, a value of a serial resistance of the LED and the like) is set so that the light emitting portion 13 does not emit the light to be visible to the occupant by the electric power generated by the request signal transmitted during the time frame T1.

As described above, the sensor electrode 12*a* of the operation detecting portion 12 is driven after the identification of the portable device 5 is completed at the time t1. The request signal continues to be transmitted via the first transmitting antenna 19 while the sensor electrode 12*a* is driven by the alternating current. However, the system ECU 41 sets the time duration of each transmission of the request signal while the sensor electrode 12*a* is driven as a time frame T2, which is longer than the time frame T1. The circuit constant of the first power supply portion 11*a* and the circuit constant of the light emitting portion 13 is set so that the light emitting portion 13 emits the Light by the electric power generated by the transmission of the request signal during the time frame T2. Consequently, the light emitting portion 13 intermittently emits the light while the sensor electrode 12*a* of the operation detecting portion 12 is driven by the alternating current. Thus, the state of the vehicle door 2 is optically indicated while the operation detecting portion 12 is driven without the electromagnetic coupling to the sensor electrode 12*a*.

When the operation of the occupant relative to the door handle 1 is detected at the time t2, the request signal stops to be transmitted and the light emitting portion 13 is turned off. When the occupant having the portable device 5 gets out of the vehicle 4 and the vehicle door 2 is locked at the time t3, the request signal starts to be transmitted. Because the portable device 5 exists in the vicinity of the vehicle 4, the identification of the portable device 5 is completed at the time t4 and the system ECU 41 is in the state of waiting for the operational input. The request signal continues to be transmitted while the system ECU 41 is in the state of waiting for the operational input. Because the time frame T2 required for each transmission of the request signal is set to be longer than the time frame T1, the light emitting portion 13 intermittently emits the light while the sensor electrode 12*a* of the operation detecting portion 12 is driven. Consequently, the occupant is optically informed that the vehicle door 2 is locked.

The sensor electrode 12*a* stops to be driven when the occupant having the portable device 5 moves out of the range where the request signal reaches and the system ECU 41 does not receive the response signal from the portable device 5 at the time t5. Consequently, the system ECU 41 returns the time duration of the carrier wave to the time frame T1 and transmits the request signal. Therefore, the light emitting portion 13 is turned off. Alternatively, as illustrated in FIG. 7, the sensor electrode 12*a* stops to be driven when the predetermined time frame T4 elapses at the time t6. Further, the system ECU 41 may stop the driving of the sensor electrode 12*a* at the time t5 or the time t6, whichever is earlier, and the time duration of the carrier wave may be returned to the time frame T1. Furthermore, the system ECU 41 may stop the driving of the sensor electrode 12*a* at the time t5 or the time t6, whichever is earlier, in the first and second embodiments.

Thus, the state of the vehicle door 2 is successfully indicated when the power supply portion 11 includes only the first power supply portion 11*a*.

[Fourth Embodiment]

Figure 9:
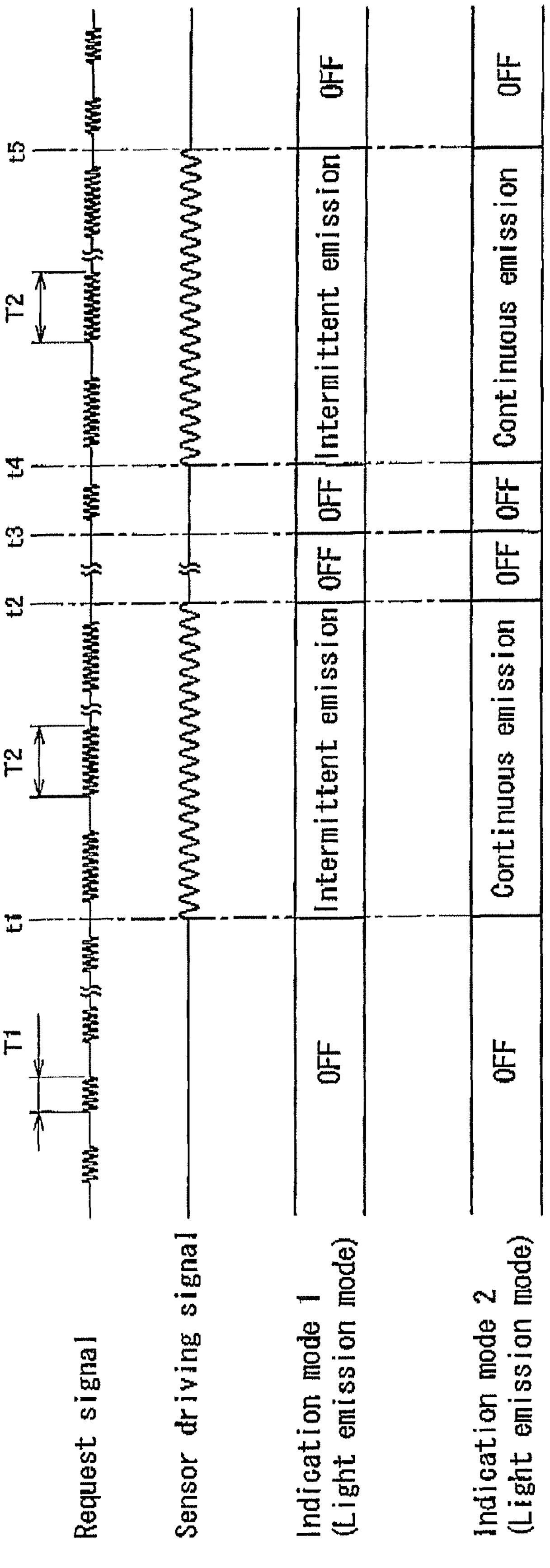
FIG. 9 is a timing chart illustrating another example of the indication sequence.

An example in which the power supply portion 11 includes only the second power supply portion 11*b* will be describer hereinafter with reference to an indication mode 2 shown in FIG. 9. The time duration of the carrier wave of the request signal, transmitted from the first transmitting antenna 19, may be the time frame T1 as well as the first embodiment, or may be variable as well as the third embodiment.

As well as the first, second and third embodiments, the request signal is transmitted via the first transmitting antenna 19 before the time t1 (i.e., before the identification of the portable device 5 is completed). At such time, the sensor electrode 12*a* is not driven and therefore the light emitting portion 13 does not emit the light. When the identification of the portable device 5 is competed at the time t1, as described above, the sensor electrode 12*a* of the operation detecting portion 12 is driven by the alternating current. The second power supply portion 11*b* (the power supply portion 11) is electromagnetically coupled to the sensor electrode 12*a* to generate the electric power. The generated electric power is supplied to the light emitting portion 13 and the light emitting portion continuously emits the light. Thus, the state of the vehicle door 2 is optically indicated while the operation detecting portion 12 is driven without generating the electric power by the electromagnetic coupling to the first transmitting antenna 19.

When the operation of the occupant relative to the door handle 2 is detected at the time t2, the sensor electrode 12 stops to be driven and the light emitting portion 13 is turned off. When the occupant having the portable device 5 gets out of the vehicle 4 and the vehicle door 2 is locked at the time t3, the request signal starts to be transmitted. Because the portable device 5 exists in the vicinity of the vehicle 4, the identification of the portable device 5 is completed at the time t4 and the system ECU 41 is in the state of waiting for the operational input. In other words, the sensor electrode 12*a* of the operation detecting portion 12 is driven by the alternating current and the second power supply portion 11*b* is electromagnetically coupled to the sensor electrode 12*a*, which is driven by the alternating current, to generate the electric power. The generated electric power is supplied to the light emitting portion 13 and the light emitting portion 13 continuously emits the light. Consequently, the occupant is optically informed that the vehicle door 2 is locked.

The sensor electrode 12*a* stops to be driven when the occupant having the portable device 5 moves out of the range where the request signal reaches and the system ECU 41 does not receive the response signal from the portable device 5 at the time t5. When the sensor electrode 12*a* stops to be driven, the second power supply portion 11*b* stops to generate the electric power and the light emitting portion 13 is turned off. As illustrated in FIG. 7, the sensor electrode 12*a* may stop to be driven when the predetermined time frame T4 elapses at the time t6. Further, the system ECU 41 may stop the driving of the sensor electrode 12*a* at the time t5 or the time t6, whichever is earlier.

Thus, the state of the vehicle door 2 is successfully indicated when the power supply portion 11 includes only the second power supply portion 11*b*.

[Other Embodiments]

When the power supply portion 11 includes only either the first power supply portion 11*a* or the second power supply potion 11*b* as described in the third and forth embodiments, the light emitting module 60 may be modified accordingly. For example, when the power supply portion 11 includes only the first power supply portion 11*a*, a circuit related to the second power supply portion 11*b* (i.e., the second connecting coil 21*b*, the tuning capacitor 22, the rectifier diode 23) does not need to be integrally formed at the light emitting module 60. The electrode insertion portion 62 may either be formed to hold the sensor electrode 12*a* or not be formed.

When the power supply portion 11 includes only the second power supply portion 11*b*, a circuit related to the first power supply portion 11*a* (i.e., the first connecting coil 21*a*, the tuning capacitor 22, the rectifier diode 23) does not need to be integrally formed at the light emitting module 60. The antenna insertion portion 61 may either be formed to hold the first transmitting antenna 19 or not be formed, A method of controlling a size of the electric power, generated at the power supply portion 11, and a manner of emitting the light from the light emitting portion 13 (the continuous light emission, the intermittent light emission and the like) by changing the duration of the carrier wave of the communication signal, transmitted from the first transmitting antenna 19, is described in the third embodiment. When the power supply portion 11 includes only the first power supply portion 11*a*, the light emission of the plurality of light emitting portions 13 may be controlled by adjusting the electric power and the circuit constant of the light emitting portions 13. For example, the light emitting portion 13, which emits the light by being supplied with an electric power smaller than a predetermined value, and the light emitting portion 13, which emits the light by being supplied with an electric power larger than a predetermined value, may be provided. Either one or two of the light emitting portions 13 may emit the light according to the size of the generated electric power. When the LEDs, by which the light emitting portions are configured, are in different colors, the visibility is further improved. Further, a mixed color may be used by mixing two colors of the LEDs.

According to the third embodiment, the example is described in which the time duration of the carrier wave of the communication signal, transmitted from the first transmitting antenna 19, is changed when the power supply portion 11 includes only the first power supply portion 11*a*. However, the system ECU 41 may change the time duration of the carrier wave of the communication signal, transmitted from the first transmitting antenna 19, when the power supply portion 11 includes the plurality of power supply portions 11. Consequently, the state of the vehicle door 2 is indicated with further variation.

According to first to fourth embodiments, an example is described in which the electrostatic capacitance sensor serves as the operation detecting portion 12. However, another sensor, which includes a portion driven by the alternating current at the door handle 1, may serve as the operation detecting portion 12. For example, a vibrating plate of a ultrasonic sensor, an electrode plate sandwiching a piezoelectric body of a piezoelectric sensor and the like may serve as the sensor electrode 12*a*. In such case, the ultrasonic sensor and the piezoelectric sensor may serve as the operation detecting portion 12.

As described in the third embodiment, the state of the vehicle door 2 is successfully indicated to the occupant when the power supply portion 11 includes only the first power supply portion 11*a*. Therefore, the embodiments may be applied to a locking system which does not include the operation detecting portion 12 and which executes the locking and the unlocking of the vehicle door 2 by determining a distance between the first transmitting antenna 19 and the portable device 5 on the basis of a strength of the radio wave of a communication therebetween.

According to the first to fourth embodiments, the door handle 1 is applied to the vehicle door 2. However, the door handle 1 is not limited to be applied to the vehicle door 2. For example, the door handle 1 may be applied to a lock and unlock apparatus, such as a house door and the like. In such case, the vehicle door 2 serves as the house door and the system ECU 41, which is provided at the vehicle, serves as a system ECU, which is provided at an inside of the house.

As described in the embodiments, the door handle 1 is provided in which the indicating portion 10, provided at the vehicle door 2, is supplied with the electric power in a simple configuration and in which the state of the door handle 1 is indicated by a simple control.

Accordingly, the indicating portion 10 is provided at the door handle 1 simply by transmitting the communication signal without additionally providing a wiring for supplying the electric power to the indicating portion 10. Therefore, the indicating portion 10, provided at the door handle 1, is supplied with the electric power in the simple structure. Further, the electric power for supplying the indicating portion 10 is generated by the communication signal transmitted to the portable device 5 via the first transmitting antenna 19 and the indicating portion 10 optically indicates the state of the vehicle door 2 with the visible light by the electric power. Therefore, the state of the vehicle door 2 is indicated by the indicating portion 10 without additionally providing the control portion controlling the indicating portion 10. In other words, the door handle 1 according to the embodiment indicates the state of the door handle 1 by a simple control.

Accordingly, the indicating portion 10 is provided at the door handle 1 simply by transmitting the communication signal without additionally providing the wiring for supplying the electric power to the indicating portion 10. Therefore, the indicating portion 10, provided at the door handle 1, is supplied with the electric power in the simple structure. Further, the electric power for supplying the indicating portion 10 is generated according to the driving of the operation detecting portion 12, which is driven by the alternating current, and the indicating portion 10 optically indicates the state of the vehicle door 2 with the visible light by the electric power. Therefore, the state of the vehicle door 2 is indicated by the indicating portion 10 without additionally providing the control portion controlling the indicating portion 10. In other words, the door handle 1 according to the embodiment indicates the state of the door handle 1 by the simple control.

According to the embodiments, the door handle 1 further includes the operation detecting portion 12, detecting the operation of the occupant relative to the door handle 1 and the second power supply portion 11*b*, electromagnetically coupled to the operation detecting portion 12, which is driven by the alternating current, and supplying the electric power to the indicating portion 10 according to the driving of the operation detecting portion 12.

Accordingly, the indicating portion 10 is provided at the door handle 1 simply by transmitting the communication signal without additionally providing the wiring for supplying the electric power to the indicating portion 10. Therefore, the indicating portion 10, provided at the door handle 1, is supplied with the electric power in the simple structure. Further, the electric power for supplying the indicating portion 10 is generated by the communication signal transmitted to the portable device 5 via the first transmitting antenna 19 and the indicating portion 10 optically indicates the state of the vehicle door 2 with the visible light by the electric power. Furthermore, the electric power for supplying the indicating portion 10 is generated according to the driving of the operation detecting portion 12, which is driven by the alternating current, and the indicating portion 10 optically indicates the state of the vehicle door 2 with the visible light by the electric power. Therefore, the state of the vehicle door 2 is indicated by the indicating portion 10 simply by driving the operation detecting portion 12 by the alternating current without additionally providing the control portion controlling the indicating portion 10. Further, different controls are executed on the first transmitting antenna 19 and the operation detecting portion 12 at different timings. Therefore, different indications are executed on the basis of the transmission of the communication signal from the first transmitting antenna 19 and the driving of the operation detecting portion 12. The different indications are not controlled by the additional control portion but controlled on the basis of a known control of the first transmitting antenna 19 and the operation detecting portion 12. Therefore, the door handle 1 according to the embodiment indicates the state of the door handle 1 by the simple control.

According to the embodiments, the indicating portion 10 includes the first light emitting portion 13*a* supplied with the electric power from the first power supply portion 11*a* and the second light emitting portion 13*b* supplied with the electric power from the second power supply portion 11*b*.

Accordingly, as described above, the different controls are executed on the first transmitting antenna 19 and the operation detecting portion 12 at the different timings. Therefore, the different indications are executed on the basis of the transmission of the communication signal from the first transmitting antenna 19 and the driving of the operation detecting portion 12. When the power supply portion 11 includes the first light emitting portion 13*a*, supplied with the electric power from the first power supply portion 11*a* and the second light emitting portion 13*b*, supplied with the electric power from the second power supply portion 11*b*, the different indications are clearly distinguished. Consequently, the visibility for the occupant is improved and the state of the vehicle door 2 is successfully indicated.

According to the embodiments, the operation detecting portion 12 includes the electrostatic capacitance sensor having the sensor electrode 12*a*, which is provided at the door handle 1 and which is driven by the alternating current.

Accordingly, the electrostatic capacitance sensor successfully detects the operation of the occupant relative to the door handle 1 even when the occupant does not contact the door handle 1. Further, the electrostatic capacitance sensor is easily applied to the door handle 1 for the vehicle 4. Therefore, the electrostatic capacitance sensor successfully serves as the operation detecting portion 12 for supplying the electric power to the indicating portion 10, provided at the door handle 1 for the vehicle 4, in the simple structure.

According to the embodiments, the first transmitting antenna 19 includes a bar antenna formed by winding the linear-shaped resonant coil 19*b* around the bar-shaped soft ferrite core 19*a*. The operation detecting portion 12 includes the electrostatic capacitance sensor having a sensor electrode 12*a*, which is provided at the door handle 1 and which is driven by the alternating current. The first power supply portion 11*a* includes the tuning circuit having the first connecting coil 21*a* electromagnetically coupled to the first transmitting antenna 19. The second power supply portion 11*b* includes the tuning circuit having the second connecting coil 21*b* electromagnetically coupled to the sensor electrode 12*a*. The indicating portion 10 includes the light emitting module 60 having the light emitting element emitting the light by being supplied with the electric power from the first power supply portion 11*a* and the second power supply portion 11*b*, the antenna insertion portion 61 receiving and holding the core 19*a* at the end portion of the bar antenna, the electrode insertion portion 62 receiving and holding the sensor electrode 12*a* at the end portion of the sensor electrode 12*a*, the first connecting coil 21*a* helically wound around the core 19*a* inserted into the antenna insertion portion 61, the second connecting coil 21*b* the end of which faces the sensor electrode 12*a* inserted into the electrode insertion portion 62 and the substrate 20 on which the first power supply circuit and the second power supply circuit are mounted. The light emitting element, the antenna insertion portion 61, the electrode insertion portion 62, the first connecting coil 21*a*, the second connecting coil 21*b* and the substrate 20 are integrally formed by the resin mold 65.

Accordingly, the light emitting module 60 serves as a holding member for holding the first transmitting antenna 19 and the sensor electrode 12*a*. The first and second power supply portions 11*a* and 11*b* are integrally provided with the light emitting module 60, serving as the holding member. Therefore, the electric power is generated by means of the first transmitting antenna 19 and the sensor electrode 12*a* by simply holding the first transmitting antenna 19 and the sensor electrode 12*a* at the light emitting module 60. Further, the light emitting elements, supplied with the electric power from the first and second power supply portions 11*a* and 11*b*, are integrally provided with the light emitting module 60. Therefore, a wiring for supplying each of the light emitting elements with the electric power is accommodated within the light emitting module 60 without separately providing a wiring for supplying each of the light emitting elements with the electric power. Consequently, the wiring is prevented from deteriorating over years and water resistance is guaranteed. Therefore, a credibility of the door handle 1, having the first and second power supply portions 11*a* and 11*b* and the indicating portion 11, is improved. Further, a product cost and a manufacturing cost are prevented from increasing because the indicating portion 10 is provided only by adding one component to a known door handle for a vehicle.

Accordingly, the indicating portion 10 is provided at the door handle 1 without additionally providing the wiring for supplying the electric power to the indicating portion 10. Therefore, the indicating portion 10, provided at the door handle 1, is supplied with the electric power in the simple structure. Further, the electric power for supplying the indicating portion 10 is generated by the communication signal transmitted to the portable device 5 via the first transmitting antenna 19 and the indicating portion 10 optically indicates the state of the vehicle door 2 with the visible light by the electric power. Therefore, the state of the vehicle door 2 is indicated via the indicating portion 10 simply by transmitting the communication signal without providing the control portion controlling the indicating portion 10 additionally to the system ECU 41. Further, the system ECU 41 may actively execute the indication according to the state of the vehicle door 2 by changing time duration of the carrier wave of the communication signal. In such case also, the state of the vehicle door 2 is indicated simply by changing the time duration of the carrier wave of the communication signal without additionally providing the control portion for controlling the indicating portion 10. Therefore, a plurality of manners of indications is easily provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A door handle for opening and closing a door, comprising:

a handle body;

a transmitting antenna located inside the door handle and transmitting a communication signal to a portable device carried by a user;

an indicating portion located inside the door handle and optically indicating a state of the door, including locked and unlocked states of the door, to the user with a visible light; and a first power supply portion located inside the door handle and electromagnetically coupled to the transmitting antenna and supplying electric power to the indicating portion according to a transmission of the communication signal from the transmission antenna.

2. The door handle according to claim 1, further comprising:

an operation detecting portion detecting an operation of the user relative to the door handle; and a second power supply portion electromagnetically coupled to the operation detecting portion, which is driven by alternating current, and supplying the electric power to the indicating portion according to a driving of the operation detecting portion.

3. The door handle according to claim 2, wherein the indicating portion includes a first indicating portion supplied with the electric power from the first power supply portion and a second indicating portion supplied with the electric power from the second power supply portion.

4. The door handle according to claim 3, wherein the transmitting antenna includes a bar antenna formed by winding a linear-shaped conductor around a bar-shaped soft ferrite core, the operation detecting portion includes an electrostatic capacitance sensor having a sensor electrode, which is provided at the door handle and which is driven by the alternating current, the first power supply portion includes a first power supply circuit having a first connecting coil electromagnetically coupled to the transmitting antenna, the second power supply portion includes a second power supply circuit having a second connecting coil electromagnetically coupled to the sensor electrode, the indicating portion includes a light emitting module having a light emitting element emitting a light by being supplied with the electric power from the first power supply portion and the second power supply portion, an antenna insertion portion receiving and holding the core at an end portion of the bar antenna, an electrode insertion portion receiving and holding the sensor electrode at an end portion of the sensor electrode, the first connecting coil helically wound around the core inserted into the antenna insertion portion, the second connecting coil an end of which faces the sensor electrode inserted into the electrode insertion portion and a substrate on which the first power supply circuit and the second power supply circuit are mounted, and wherein the light emitting element, the antenna insertion portion, the electrode insertion portion, the first connecting coil, the second connecting coil and the substrate are integrally formed by a resin mold.

5. The door handle according to claim 2, wherein the operation detecting portion includes an electrostatic capacitance sensor having a sensor electrode, which is provided at the door handle and which is driven by the alternating current.

6. The door handle according to claim 1, wherein the door is a vehicular door.

7. A door handle for opening and closing a door, comprising:

a handle body;

an operation detecting portion located inside the door handle and electrically detecting an operation of a user relative to the door handle;

an indicating portion located inside the door handle and optically indicating a state of the door, including locked and unlocked states of the door, to the user with a visible light; and a power supply portion located inside the door handle and electromagnetically coupled to the operation detecting portion, which is driven by alternating current, and supplying electric power to the indicating portion according to a driving of the operation detecting portion.

8. The door handle according to claim 7, wherein the operation detecting portion includes an electrostatic capacitance sensor having a sensor electrode, which is provided at the door handle and which is driven by the alternating current.

9. The door handle according to claim 8, wherein the transmitting antenna includes a bar antenna formed by winding a linear-shaped conductor around a bar-shaped soft ferrite core, the operation detecting portion includes the electrostatic capacitance sensor having the sensor electrode, which is provided at the door handle and which is driven by the alternating current, the first power supply portion includes a first power supply circuit having a first connecting coil electromagnetically coupled to the transmitting antenna, the second power supply portion includes a second power supply circuit having a second connecting coil electromagnetically coupled to the sensor electrode, the indicating portion includes a light emitting module having a light emitting element emitting a light by being supplied with the electric power from the first power supply portion and the second power supply portion, an antenna insertion portion receiving and holding the core at an end portion of the bar antenna, an electrode insertion portion receiving and holding the sensor electrode at an end portion of the sensor electrode, the first connecting coil helically wound around the core inserted into the antenna insertion portion, the second connecting coil an end of which faces the sensor electrode inserted into the electrode insertion portion and a substrate on which the first power supply circuit and the second power supply circuit are mounted, and wherein the light emitting element, the antenna insertion portion, the electrode insertion portion, the first connecting coil, the second connecting coil and the substrate are integrally formed by a resin mold.

10. A locking system transmitting a communication signal to a portable device carried by a user, receiving a receiving signal from the portable device, identifying the portable device on the basis of identification data included in the receiving signal, unlocking a door on which is mounted a door handle based on an operation of the user relative to the door after an identification of the portable device and locking the door on the basis of a predetermined condition when the user having the portable device is outside the vehicle, the locking system comprising:

a handle body;

a transmitting antenna located inside the door handle and transmitting the communication signal to the portable device;

an indicating portion located inside the door handle and optically indicating a state of the door, including locked and unlocked states of the door, to the user with a visible light;

a power supply portion located inside the door handle and electromagnetically coupled to the transmitting antenna and supplying electric power to the indicating portion according to an operation of the communication signal; and a system control portion transmitting the communication signal via the transmitting antenna and indicating the state of the door via the indicating portion by changing a time duration of a carrier wave of the communication signal according to the state of the door.

11. The locking system according to claim 10, wherein the door is a vehicular door.

* * * * *